United States Patent [19]
Shimomura et al.

[11] Patent Number: 5,590,035
[45] Date of Patent: Dec. 31, 1996

[54] OUTPUT CONTROL CIRCUIT

[75] Inventors: Takehiko Shimomura; Takashi Miyake, both of Itami, Japan

[73] Assignee: Mitsubishi Denki Kabushiki Kaisha, Tokyo, Japan

[21] Appl. No.: 354,168

[22] Filed: Dec. 8, 1994

[30] Foreign Application Priority Data

Dec. 24, 1993 [JP] Japan .................................. 5-327766

[51] Int. Cl.⁶ ................................................. G05B 11/01
[52] U.S. Cl. ........................... 364/177; 364/140; 364/141
[58] Field of Search .................................. 364/177, 422, 364/140, 141, 142, 143, 144, 145, 146, 147; 395/427

[56] References Cited

U.S. PATENT DOCUMENTS 4,940,904  7/1990  Lin .......................................... 307/262

Primary Examiner—Roy N. Envall, Jr.
Assistant Examiner—Karen D. Presley
Attorney, Agent, or Firm—Lowe, Price, LeBlanc & Becker

[57] ABSTRACT

An output control circuit capable of reducing a time lag at the time of switching connection of a flip-flop 3 and port latch 2, which output PWM waveforms, with an input/output terminal 5 to provide a more real-time control, and increasing the control accuracy, by setting data specifying a port latch 2 or flip-flop 3 which is a signal source to be connected next with an input/output terminal in an operation mode reload register 7 beforehand, and reloading the data directly to an operation mode register 4 by means of a reload signal RL.

8 Claims, 7 Drawing Sheets

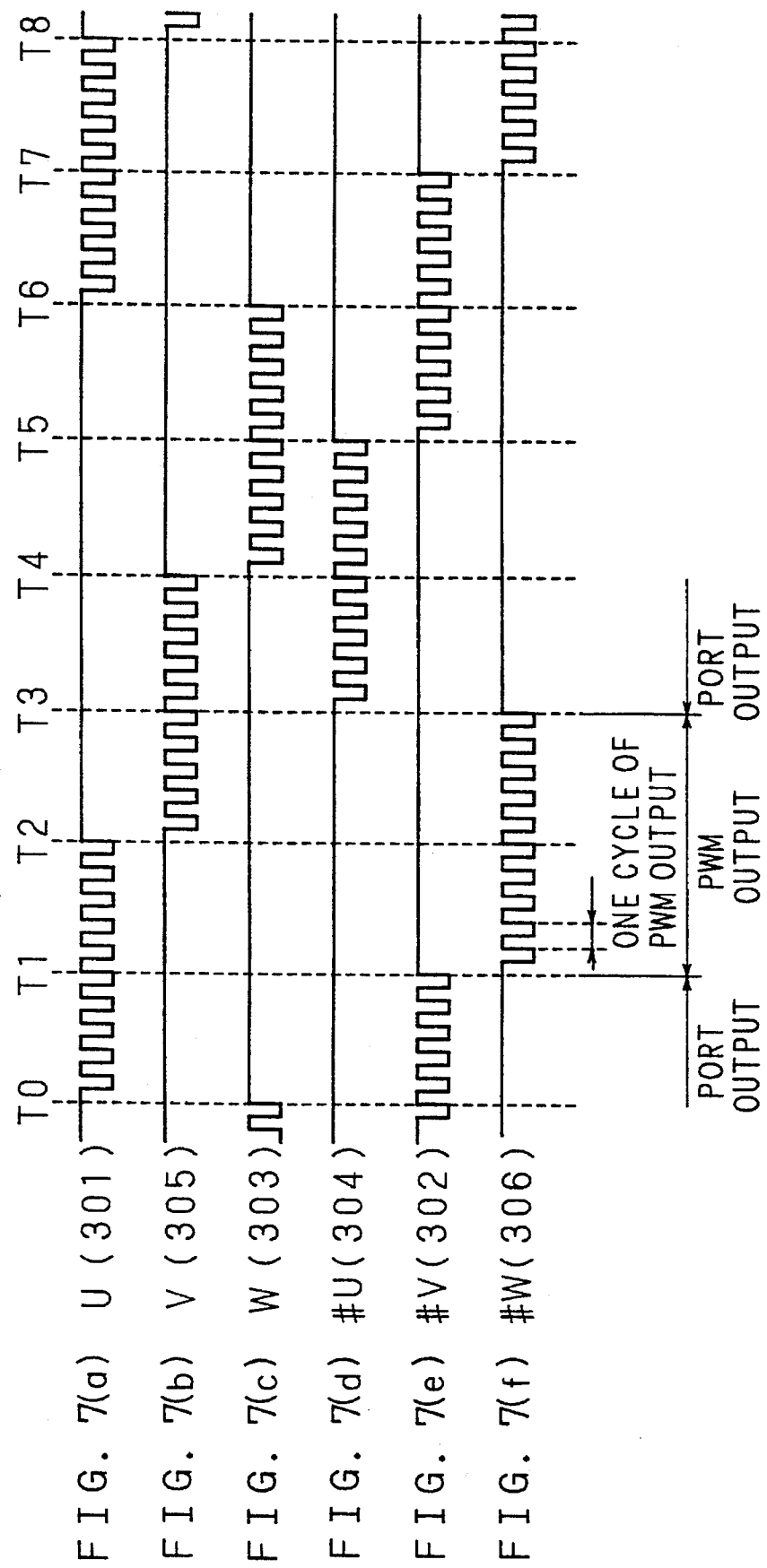

OUTPUT CONTROL CIRCUIT

BACKGROUND OF THE INVENTION

1. Field of the Invention

The present invention relates to an output control circuit of a microcomputer, more particularly to, an output control circuit known as so-called programmable input/output port that allows switching functions of an output terminal of the microcomputer by means of software.

2. Description of the Related Art

FIG. 1 is a block diagram illustrating an example of conventional configuration arrangement wherein the input/output terminal serves as a function of an input/output port as well as a function of an output of PWM waveform for driving a three-phase motor, when a microcomputer is used as an actuator control apparatus.

in FIG. 1, numeral 30 denotes a microcomputer, and 100 an actuator, for example, a three-phase motor controlled by the microcomputer 30.

The actuator 100 is driven and controlled by means of a control signal outputted from an input/output terminal 5 of the microcomputer 30. The actuator 100 is equipped with a sensor 101 that generates a sensor signal rising from "L" level to "H" level when a certain state of the actuator 100 is detected, and inputs it through an external input terminal 32 of the microcomputer 30 to a CPU 31. Thus, the CPU 31 of the microcomputer 30 controls the actuator 100 according to the sensor signal of sensor 101 inputted through the external input terminal 32.

In FIG. 1, the CPU 31 and an output control circuit are shown as an internal configuration of the microcomputer 30.

Numeral 1 denotes a direction register to which data for specifying the input/output direction of a signal from the input/output terminal 5 is set, 2 a port latch for holding a data inputted/outputted into/from the input/output terminal 5, 3 a flip-flop for generating a PWM waveform, and 4 an operation mode register to which data for specifying whether the input/output terminal 5 should serve as an input/output terminal of the data or an output terminal for a PWM waveform is set, and all of them are connected with the CPU 31 by means of a data bus 6.

Numeral 51 denotes an OR gate receiving an output of the direction register 1 at one input terminal and an output of the operation mode register 4 at the other input terminal thereof. An output of the OR gate 51 is directly inputted to an input terminal of a NAND gate 57, inverted by an inverter 56, and further inputted, then, to an input terminal of a NOR gate 58.

Numerals 52 and 53 are gates controlled by data set in the operation mode register 4. The gate 52 conducts when the output of the operation mode register 4 is at "L" level (data "0" is set), and outputs the content of the port latch 2. An output of the gate 52 is inputted to the other input terminal of the NAND gate 57 and the other input terminal of the NOR gate 58. The gate 53 conducts when the output of the operation mode register 4 is at "H" level (data "1" is set), and outputs the content, of the flip-flop 3. An output of the gate 53 is connected with the output of the gate 52 in wired OR arrangement.

Accordingly, the gate 53 conducts when the output of the operation mode register 4 is at "H" level ("1"), and the output (PWM waveform) of the flip-flop 3 is inputted to the NAND gate 57 and NOR gate 58, while the gate 52 conducts when the output of the operation mode register 4 is at "L" level ("0"), and the content of the port, latch 2 is inputted to the NAND gate 57 and NOR gate 58.

Numerals 54 and 55 are gates controlled by data set in the direction register 1. The gate 54 conducts when the output of the direction register 1 is at "H" level (data "1" is set), and outputs the content of the port latch 2 to the data bus 6. The gate 55 conducts when the output of the direction register 1 is at "L" level (data "0" is set), and outputs a signal, which is inputted from the outside to the input/output terminal 5, to the data bus 6.

Thus, the gate 54 conducts when the output of the direction register 1 is at "H" level ("1"), and the content of the port latch 2 is outputted to the data bus 6, while the gate 55 conducts when the output, of the direction register 1 is at "L" level ("0"), and an input signal, which is inputted from the outside to the input/output terminal 5, is outputted to the data bus 6.

An output of the NAND gate 57 is supplied to a gate of a P-channel transistor 59. The P-channel transistor 59 is also connected with a source voltage at its source, the input/output terminal 5 and an input terminal of the gate 55 at its drain. On the other hand, an output of the NOR gate 58 is supplied to a gate of an N-channel transistor 60. The N-channel transistor 60 is also connected with the input/output terminal 5 and an input terminal of the gate 55 at its drain and a ground potential at its source.

When the input/output terminal 5 is used as a general input/output port, "0" is written into the operation mode register 4 by the CPU 31 through the data bus 6. Thereby, the gate 52 comes to be conductive state, and the gate 53 non-conductive state, data held by the port latch 2 is inputted to the other input terminals of the NAND gate 57 and NOR gate 58. In such state, when "0" is written into the direction register 1 by the CPU 31 through the data bus 6, as the output of the OR gate 51 is fixed to "0", that of the NAND gate 57 to "1", that of the NOR gate 58 to "0", and the gate 55 comes to be conductive state, an input signal, which is inputted from the outside to the input/output terminal 5, is supplied through the gate 55 to the port latch 2, and the value is stored.

On the other hand, when "1" is written in the direction register 1 through the data bus 6 by the CPU 31, the output of the OR gate 51 is fixed to "1", those of the NAND gate 57 and NOR gate 58 are inverted in value from that of the gate 52, and the gate 52 is conductive state, a value in the port latch 2 is outputted from the input/output terminal 5.

When the input/output terminal 5 is used as an output terminal of PWM waveforms, the CPU 31 writes "1" to the operation mode register 4 through the data bus 6. Accordingly, because the gate 52 comes to be non-conductive state, and the gate 53 conductive state, an output of the flip-flop 3 is inputted to the NAND gate 57 and NOR gate 58. In such a state, since the output of the OR gate 51 is fixed to "1" regardless of the content of direction register 1, a PWM waveform is outputted from the input/output terminal 5 as the CPU 31 periodically sets and resets the flip-flop 3 through the data bus 6. The actuator 100 can be, therefore, driven and controlled, when it is a three-phase motor or the like.

Thus, the output control circuit known as a programmable input/output port is provided with the direction register 1, operation mode register 4 and data bus 6, and can be programmed for allowing the input/output terminal 5 to serve as an input port or an output port by setting a value in the direction register 1 by means of the CPU 31 as well as for allowing the input/output terminal 5 to serve as an output terminal of PWM waveforms by setting a value in the operation mode register 4 by means of the CPU 31.

In a conventional output control circuit having such input/output terminal as described above as an input/output port and an output terminal of PWM waveforms, when a PWM waveform is outputted for driving a three-phase motor, the output of PWM waveform and port output must be controlled by switching to each other according to such external information, for example, as a rotating angle of the three-phase motor. However, at such switching operation, because the CPU must write data into the operation mode register by means of software as described above, it has been a problem that a time lag is caused, and a controlling accuracy is reduced.

SUMMARY OF THE INVENTION

The present invention has been devised in such circumstances, it is an object of the invention to provide an out-put control circuit capable of achieving more real-time control by reducing a time lag in switching between functions as an output of PWM waveform and as a port output and improving the controlling accuracy.

An output control circuit according to the invention is configured such that information for specifying a signal source which should be connected succeedingly with an input/output terminal is set beforehand in an operation mode reload register serving as second storing means, and the information is reloaded by a reload signal directly to an operation mode register as the first storing means.

An output control circuit of the invention is further provided with reload signal generating means for generating a reload signal according to an external input signal inputted from the external input terminal.

Furthermore, an output control circuit of the invention comprises plural portions other than that of the reload signal generating means, and their respective second storing means configure a shift, register.

Moreover, an output control circuit of the invention comprises six portions other than that of the reload signal generating means, and each of which generates three phases of PWM waveform and its inverted phase, and each of the second storing means configure a shift register.

In an output, control circuit according to the invention, information for specifying a signal source that is to be connected next to an input/output terminal is directly reloaded from the second storing means to the first storing means by a reload signal, and connection of an output terminal with signal sources is thereby switched.

In addition, in an output control circuit of the invention, the reloading of the information for specifying the signal source from the second storing means to the first storing means is executed by inputting an external signal to an external input terminal.

Further, in an output control circuit of the invention, data set in the shift register configured by the second storing means is periodically reloaded to the respective first storing means.

Moreover, in an output control circuit of the invention, three phases of a PWM waveform and their inverted phases are generated by reloading data set in the shift register configured by the second storing means to the respective first storing means.

The above and further objects and features of the invention will more fully be apparent from the following detailed description with accompanying drawings.

BRIEF DESCRIPTION OF THE DRAWINGS

FIGS. 7(a) to 7(f) are waveform charts showing an example of output corresponding to a three-phase output waveform by the second embodiment of the output control circuit according to the invention.

DESCRIPTION OF THE PREFERRED EMBODIMENTS

Figure 1:
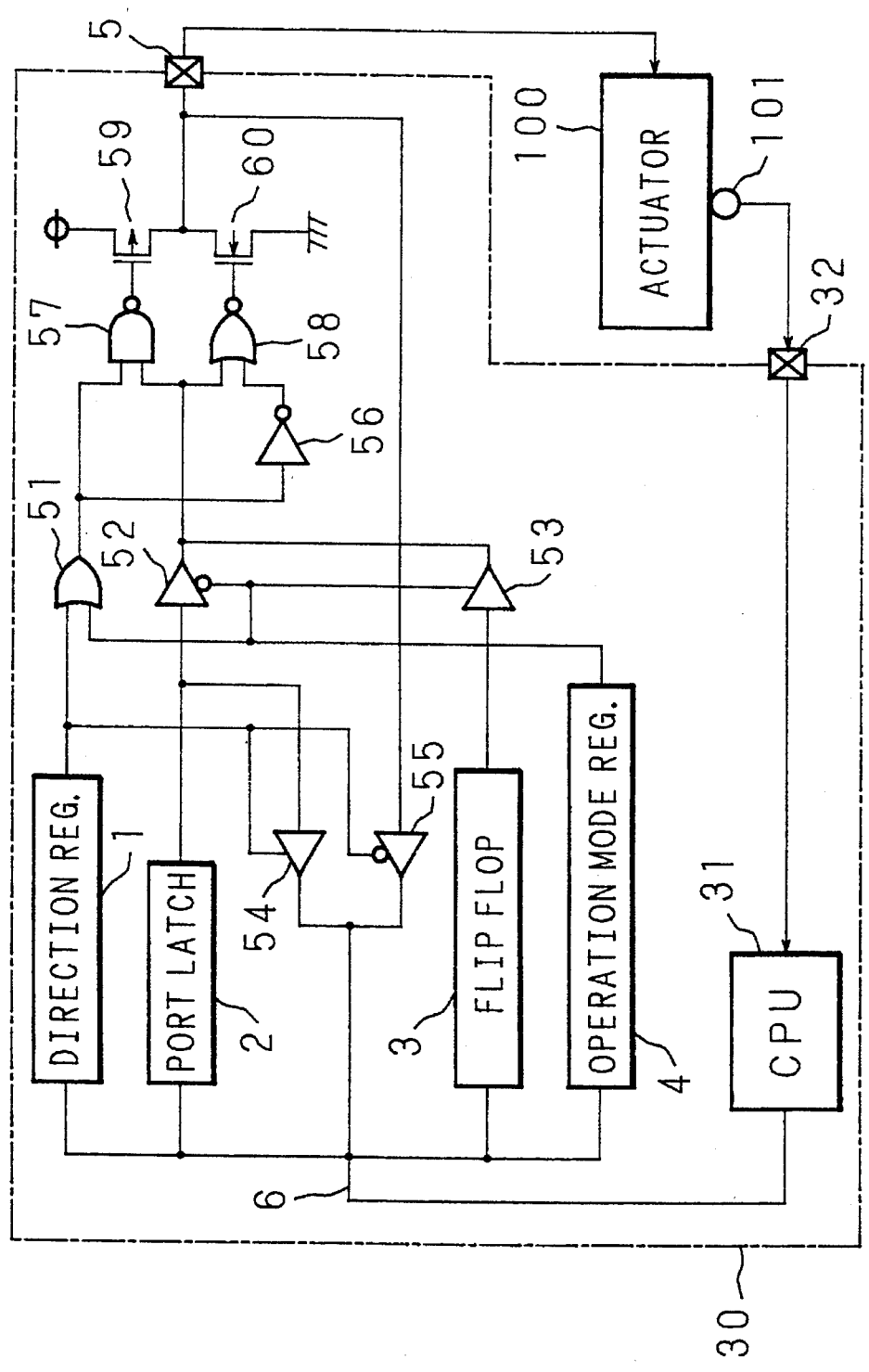
FIG. 1 is a block diagram illustrating a configuration example of a conventional output control circuit.

By referring to the drawings, embodiments of the invention are now described in detail.

Figure 2:
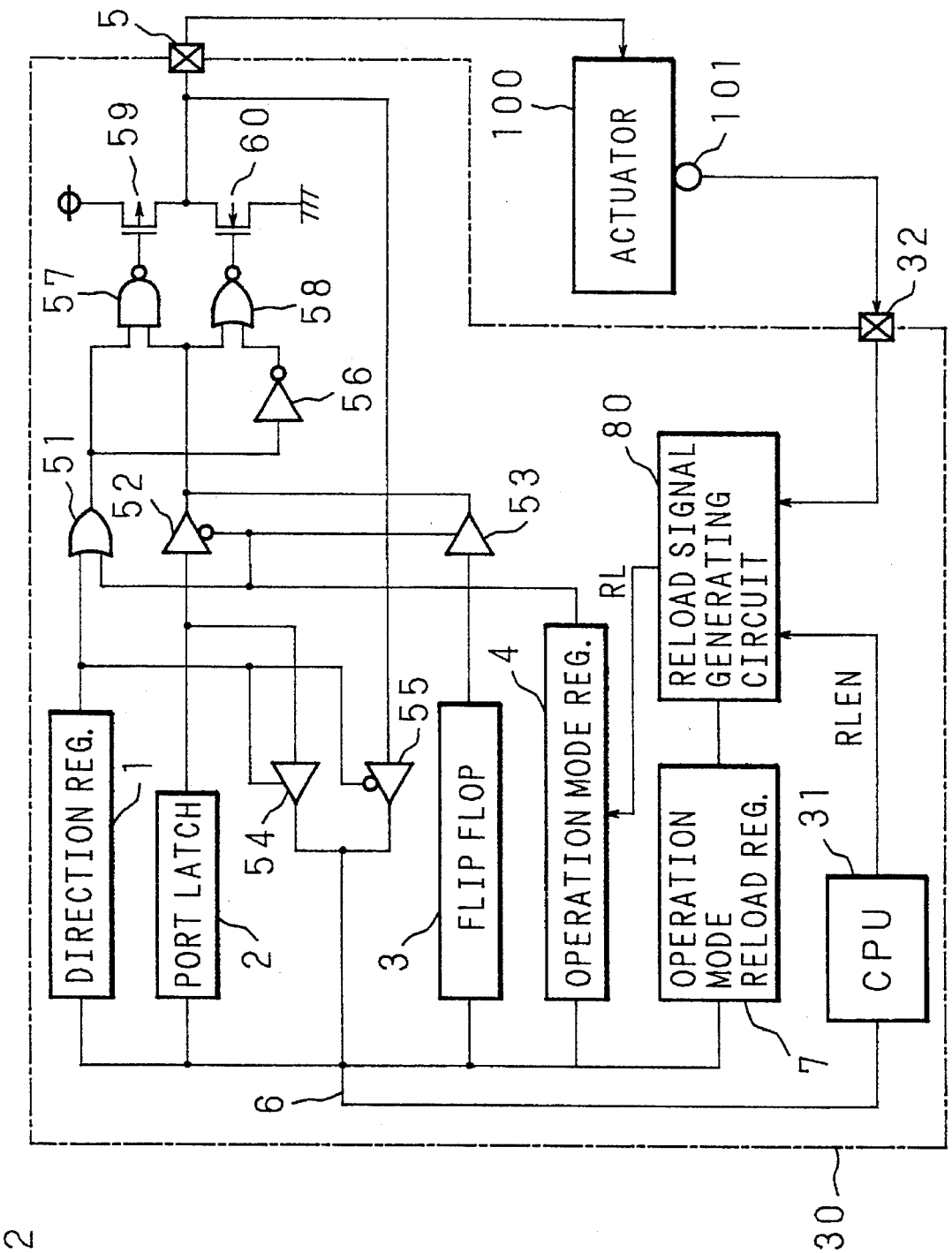
FIG. 2 is a block diagram illustrating a configuration example of a first embodiment of an output control circuit according to the invention.

FIG. 2 is a block diagram illustrating a configuration example of an output control circuit according to the invention, wherein an input/output terminal serves a function of as an input/output port and as a function of an output of PWM waveforms for driving a three-phase motor, when a microcomputer is used as a controller for an actuator.

In the figure, reference numerals identical to those in FIG. 1 depict identical or corresponding parts that were referred to in the description of the conventional example.

In FIG. 2, numeral 30 denotes a microcomputer, and 100 an actuator, for example, a three-phase motor controlled by the microcomputer 30.

The actuator 100 is driven and controlled by means of a control signal outputted from an input/output terminal 5 of the microcomputer 30. The actuator 100 also comprises a sensor 101 which generates a sensor signal rising from "L" level to "H" level when a certain state of the actuator 100 is detected, and inputs it through an external input terminal 32 of the microcomputer 30.

In FIG. 2, a CPU 31 and a first embodiment of the output control circuit according to the invention as an internal configuration of the microcomputer 30 are shown.

Numeral 1 denotes a direction register to which data for specifying the input/output direction of a signal from the input/output terminal 5 is set, 2 a port latch as a first signal source for holding data inputted/outputted data from/to the input/output terminal 5, 3 a flip-flop as a second signal source for generating a PWM waveform, 4 an operation mode register as a first storing means to which data for specifying whether the input/output terminal 5 should serve as an input/output terminal of the data or an output terminal for a PWM waveform is set, 7 an operation mode reload register as a second storing means to which data to be set in the operation mode register 4 beforehand is set by the CPU 31, and all of them are connected to the CPU 31 by means of the data bus 6. Additionally, numeral 80 denotes a reload signal generating circuit characterizing the invention, to which an input signal from the external input terminal 32 and a reload enable signal RLEN generated by the CPU 31 are supplied, as described in detail below.

Numeral 51 denotes an OR gate which is given an output of the direction register 1 at one input terminal and an output of the operation mode register 4 at the other input terminal thereof. An output of the OR gate 51 is directly inputted to an input terminal of a NAND gate 57 as well as inputted to an input terminal of a NOR gate 58 after being inverted by an inverter 56.

Numerals 52 and 53 denote gates controlled by data which is set at the operation mode register 4. The gate 52 conducts when the output of the operation mode register 4 is at "L" level (data "0" is set), and outputs the content of the port latch 2. An output of the gate 52 is inputted to the other input terminal of the NAND gate 57 and the other input terminal of the NOR gate 58. The gate 53 conducts when the output of the operation mode register 4 is at "H" level (data "1" is set), and outputs the content of the flip-flop 3. An output of the gate 53 is connected with the output of the gate 52 in wired OR arrangement.

Accordingly, the gate 53 conducts when the output of the operation mode register 4 is at "H" level ("1"), and the output (PWM waveform) of the flip-flop 3 is inputted to the NAND gate 57 and NOR gate 58, while the gate 52 conducts when the output of the operation mode register 4 is at "L" level ("0"), and the content of port latch 2 is inputted to the NAND gate 57 and NOR gate 58.

Numerals 54 and 55 denote gates controlled by data which is set in the direction register 1. The gate 54 conducts when the output of the direction register 1 is at "H" level (data "1" is set), and outputs the content of the port latch 2 to the data bus 6. The gate 55 conducts when the output of the direction register 1 is at "L" level (data "0" is set), and outputs a signal, which is inputted from the outside to the input/output terminal 5, to the data bus 6.

Thus, the gate 54 conducts when the output of the direction register 1 is at "H" level ("1"), and the content of the port latch 2 is outputted to the data bus 6, while the gate 55 conducts when the output of the direction register 1 is at "L" level ("0"), and an input signal, which is inputted from the outside to the input/output terminal 5, is outputted to the data bus 6.

An output of the NAND gate 57 is supplied to a gate of a P-channel transistor 59. The P-channel transistor 59 is also connected with a source voltage at its source, and with the input/output terminal 5 and an input terminal of the gate 55 at its drain. On the other hand, an output of the NOR gate 58 is supplied to a gate of an N-channel transistor 60. The N-channel transistor 60 is also connected with the input/output terminal 5 at its drain and with a ground potential at its source.

Figure 3:
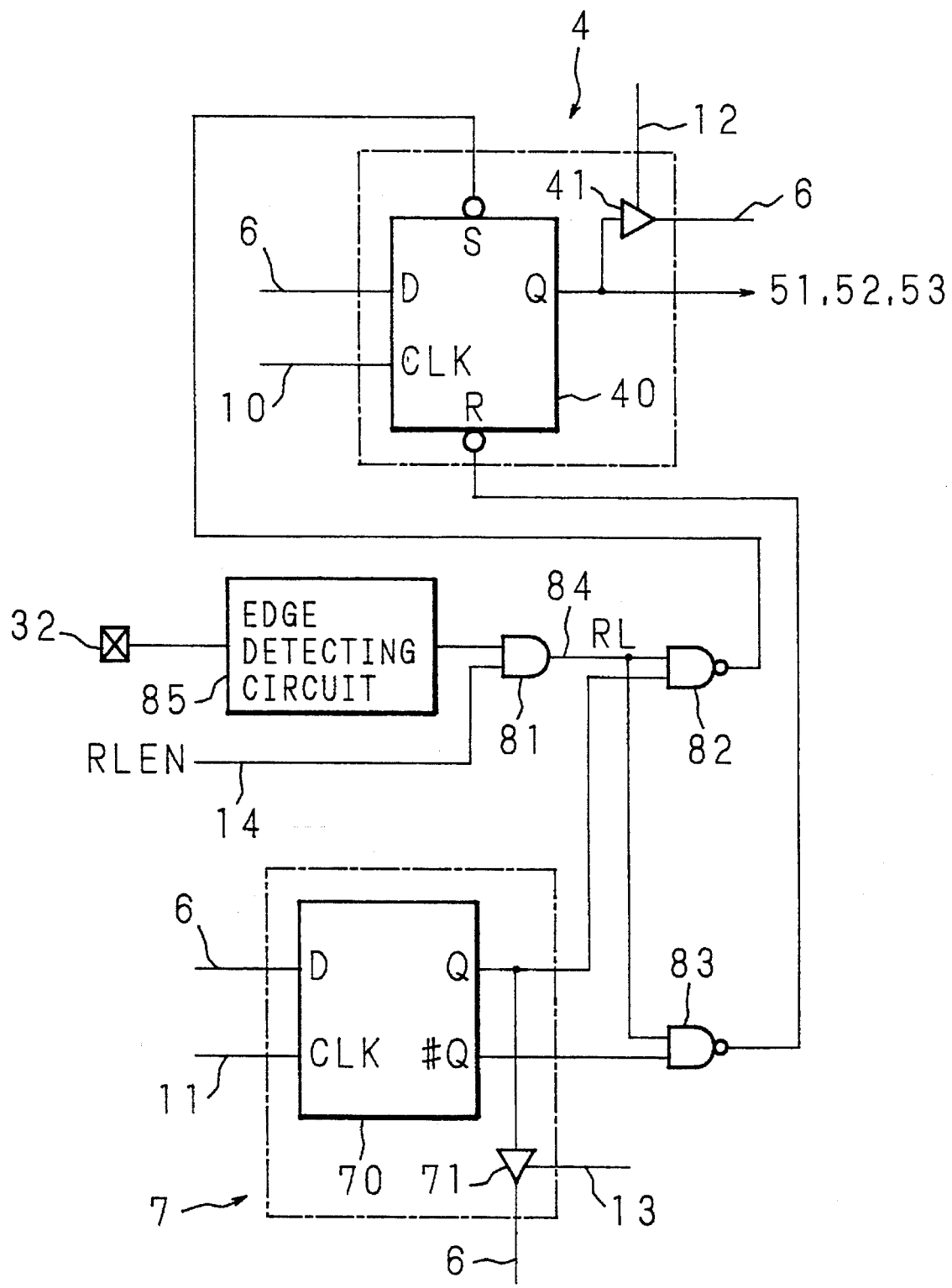
FIG. 3 is a circuit diagram illustrating a specific configuration of a reload signal generating circuit for reloading the content of an operation mode reload register to an operation mode register of the output control circuit according to the invention.

FIG. 3 is a circuit diagram showing an example of a specific configuration of a reload signal generating circuit 80 for reloading the content of the operation mode reload register 7 to the operation mode register 4, and the specific configuration of the operation mode register 4 and operation mode reload register 7 are also shown.

In FIG. 3, numeral 85 denotes an edge detecting circuit for detecting a change in level (a rising edge from "L" level to "H" level in the embodiment) of an input signal inputted from the outside to the external input terminal 32, and outputting an "H" level signal. An output signal of the edge detecting circuit 85 is supplied to one of input terminals of an AND gate 81. A high active reload enable signal RLEN is supplied to the other input terminal of the AND gate 81 by the CPU 31 through a signal line 14. Then, when both input signals to the AND gate 81 are at high level, the AND gate 81 generates a reload signal RL of "H" level, and supplies it to one of the input terminals of NAND gates 82 and 83.

Incidentally, the edge detecting circuit 85 and the AND gate 81 configure the reload signal generating means, and the NAND gates 82 and 83 configure the reloading means.

An output signal from an output terminal Q of a flip-flop 70 which is a main component of the operation mode reload register 7 is supplied to the other input terminal of the NAND gate 82. Then, an output signal of the NAND gate 82 is supplied to a set terminal S of a flip-flop 40 which is a main component of the operation mode register 4. In addition, an output signal from an output terminal #Q (# denotes an inverted signal) of the aforementioned flip-flop 70 is supplied to the other input terminal of the NAND gate 83. And an output signal of the NAND gate 83 is supplied to a reset terminal R of the flip-flop 40.

As shown in FIG. 2, the output signal from the output terminal Q of the operation mode register 4 is supplied to gates 51, 52 and 53, and can also be outputted through a gate 41 to the data bus 6. The gate 41 is controlled by a read signal 12 given from the CPU 31. In addition, for writing data from the CPU 31 to the operation mode register 4, by inputting a write signal 10 from the CPU 31 to a clock terminal CLK of the flip-flop 40 so that the data is written from a terminal D through the data bus 6.

The signal outputted from the output terminal Q of the operation mode reload register 7 can also be outputted to the data bus 6 through a gate 71. The gate 71 is controlled by a read signal 13 given from the CPU 31. In addition, for writing data from the CPU 31 to the operation mode reload register 7, by inputting a write signal 11 from the CPU 31 to a clock terminal CLK of the flip-flop 70 so that, the data is written from a terminal D through the data bus 6.

Operation of the first embodiment of the output control circuit having such a configuration as aforementioned of the invention is now described.

A data held by the operation mode reload register 7 is reloaded to the operation mode register 4 as described below.

When the sensor signal inputted to the external input terminal 32 from the sensor 101 of the actuator 100 rises from "L" level to "H" level, the leading edge is detected by the edge detecting circuit 85. At this moment, when the reload enable signal RLEN of "H" level is outputted by the CPU 31, since both inputs of the AND gate 81 are at "H" level, its output signal becomes "H" level, and the reload signal RL is generated.

When it is assumed that "1", for example, is set at the flip-flop 70 of the operation mode reload register 7. Accordingly, the output, signal from the output terminal Q of the flip-flop 70 is at "H" level, and that from the output terminal #Q is at "L" level.

By generating the reload signal RL of "H" level in such a manner, the output signal of "H" level from the output terminal Q of the flip-flop 70 of the operation mode reload register 7 is inverted to "L" level by the NAND gate 82 and given to the set terminal S of the flip-flop 40 of the operation mode register 4, while the output signal of "L" level from the output terminal #Q of the flip-flop 70 of the operation mode reload register 7 is inverted to "H" level by the NAND gate 83 and given to the reset terminal R of the flip-flop 40 of the operation mode register 4.

Thus, because the flip-flop 40 of the operation mode register 4 is set, data "1" set beforehand in the flip-flop 70 of the operation mode reload register 7 by the CPU 31 is reloaded to the flip-flop 40 of the operation mode register 40 upon inversion of an external input signal to the external input terminal 32 from "L" level to "H" level when the reload enable signal RLEN is at "H" level.

On the contrary, when "0" is set in the flip-flop 70 of the operation mode reload register 7, since an "H" level signal is supplied to the set terminal S, and an "L" level signal to the reset terminal R of the flip-flop 40 of the operation mode register 4, the flip-flop 40 is reset, and "0" is reloaded.

It should be appreciated that the reloading of data from the operation mode reload register 7 to the operation mode register 4 is executed only when the reload signal RL is at high level. In the case where "1" or "0" is set in the operation mode register 4, because the output control circuit itself is operated in a similar manner to the prior art, it is not described here.

When it is required to read a value in the operation mode register 4 and that in the operation mode reload register 7, the read signals 12 and 13 can be supplied by the CPU 31, respectively.

As described above, in comparison with functions of the conventional input terminal, a time lag in switching between the operation modes is reduced, and the control accuracy is improved in the output control circuit of the invention, because cause data set in the operation mode reload register 7 is directly reloaded to the operation mode register 4 when it is required, that is, in the case where an input signal to the external input terminal 32 is changed (from "L" to "H" level, for example), under the condition that data is stored beforehand to the operation mode reload register 7 by the CPU 31.

Figure 4:
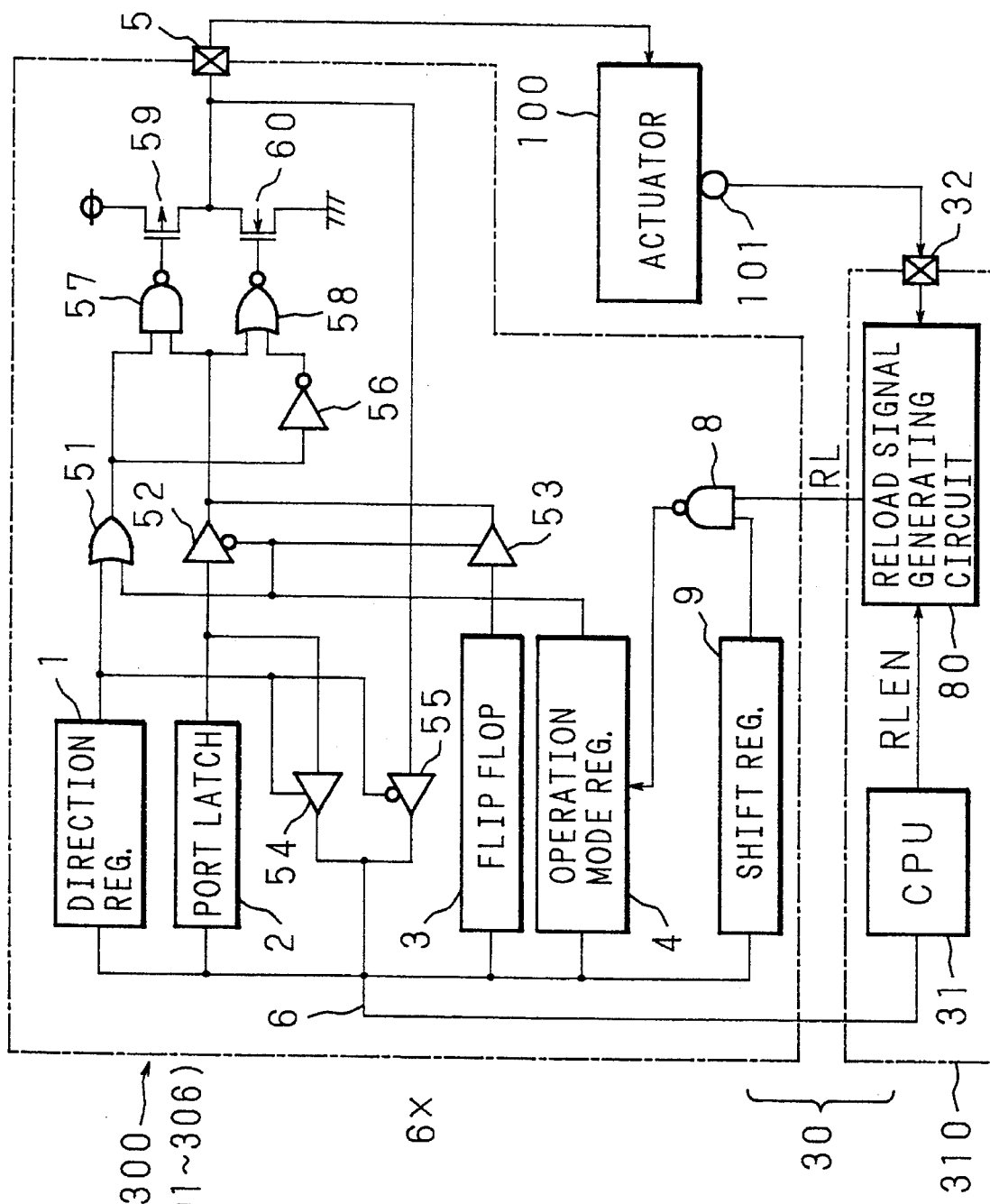
FIG. 4 is a block diagram illustrating a configuration example of a second embodiment of the output control circuit according to the invention.

FIG. 4 is a block diagram showing a second embodiment of the output control circuit according to the invention.

The point that the second embodiment is different from the first embodiment is that a register 9 among plural registers forming a shift register as described below is provided in the second embodiment in place of the operation mode reload register 7 in the first embodiment. In addition, the register 9 and the operation mode register 4 is connected by a NAND gate 8, and an output of the reload signal generating circuit 80 is also supplied to the NAND gate 8.

Similarly to the first embodiment, a reload enable signal RLEN generated by a CPU 31 is supplied to a reload signal generating circuit 80, and an external input signal to an external input terminal 32. Also, the register 9 serves as second storing means similarly to the operation mode reload register 7 of the first embodiment.

Figure 5:
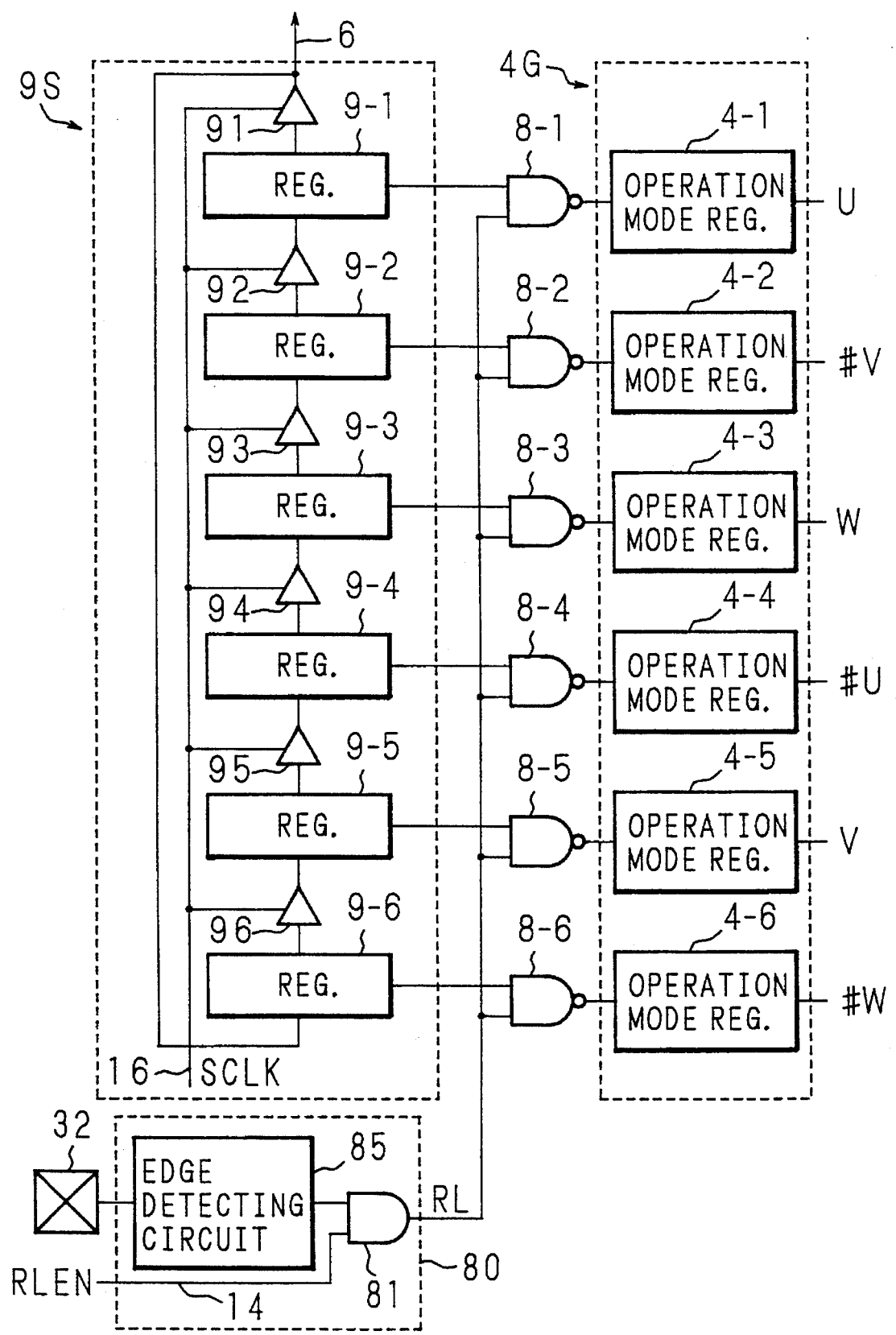
FIG. 5 is a circuit diagram illustrating a specific configuration of an operation mode register, an operation mode reload register and a reload signal generating circuit connected to obtain an output of PWM waveform for driving a three-phase motor in the second embodiment of the output control circuit according to the invention.

FIG. 5 is a circuit diagram illustrating a configuration example of the operation mode register 4, register 9 and reload signal generating circuit 80 shown in FIG. 4 connected to output the PWM waveform for driving a three-phase motor in the second embodiment of the output control circuit according to the invention. In this example, registers 9-1 to 9-6 configuring a shift register corresponding to the phases U, V, W, #U, #V and #W, respectively, to provide a three-phase output waveform for driving the three-phase motor.

In other words, an entire microcomputer comprises six portions excluding the CPU 31 and the reload signal generating circuit 80 among the microcomputer 30 having such a configuration shown in FIG. 4, which is depicted by numeral 300, and a portion consisting of the CPU 31, reload signal generating circuit 80 and external input terminal 32, which is denoted by numeral 310. Thus, in a block diagram of FIG. 6 shown schematically, the portion depicted by numeral 310 in FIG. 4 which comprises the CPU 31, reload signal generating circuit. 80 and external input terminal 32, is provided conveniently as a reload signal generating unit, and six portions shown by numeral 300 as output control units 301 to 306, respectively.

Figure 6:
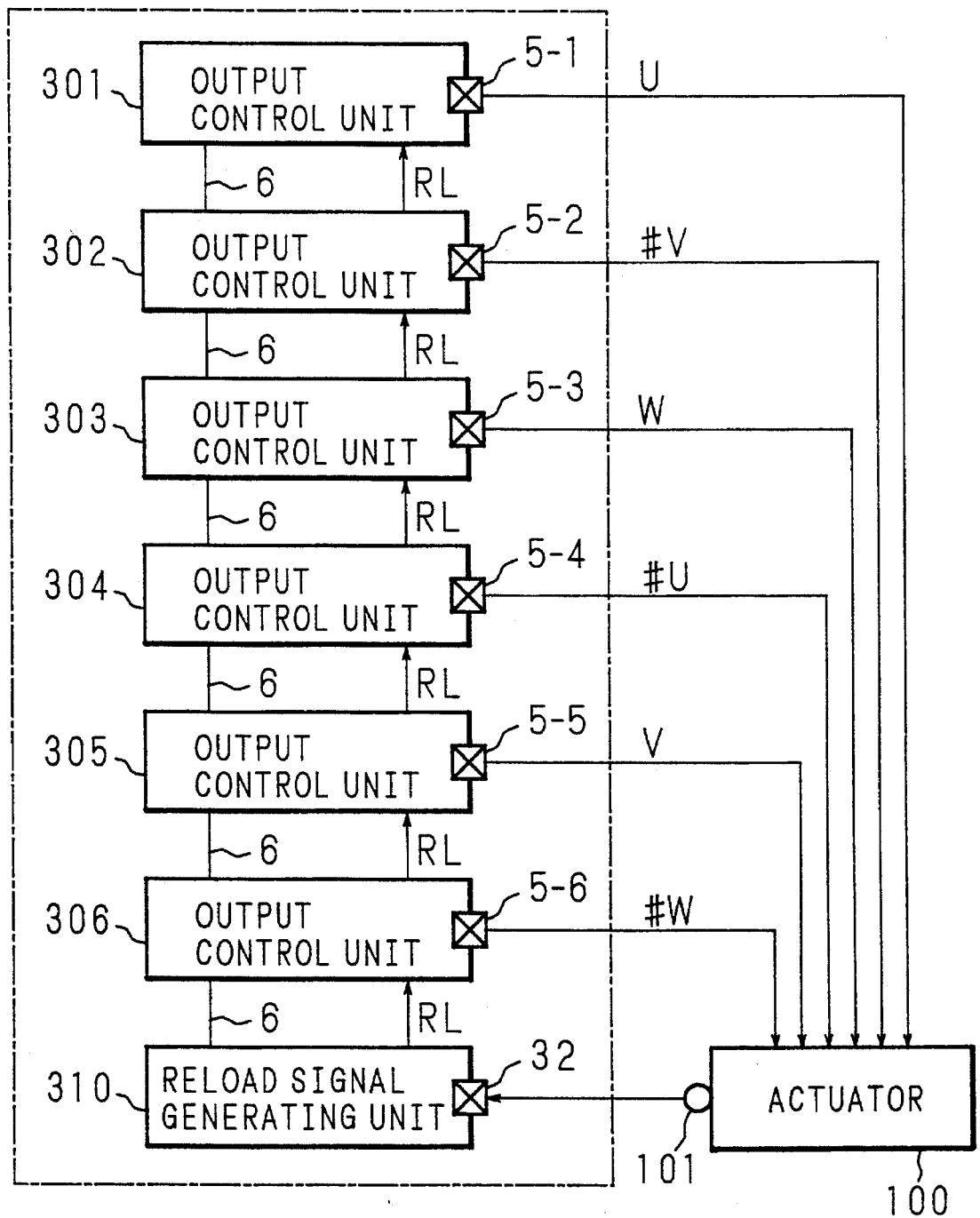
FIG. 6 is a block diagram schematically showing the whole of the second embodiment of the output control circuit according to the invention.

In the configuration of FIG. 6, six registers 9 included in the output control units 301 to 306 (respectively denoted by 9-1, 9-2, 9-3, 9-4, 9-5 and 9-6, and the entirety as a shift register 9S, six NAND gates 8 (respectively denoted by 8-1, 8-2, 8-3, 8-4, 8-5 and 8-6), six operation mode registers 4 (respectively denoted by 4-1, 4-2, 4-3, 4-4, 4-5 and 4-6, and the entirety as an operation mode register group 4G), an edge detecting circuit 85 and an AND gate 81 are connected with each other as shown in the block diagram of FIG. 6.

It should be appreciated that the shift register 9S is configured as a circulating type, gates 91 to 96 controlled by a shift clock SCLK are connected between the registers 9-1, 9-2, 9-3, 9-4, 9-5 and 9-6, respectively, thus, data is shifted from the register 9-6 side to the 9-1 side in succession, and data in the register 9-1 is shifted to the register 9-6.

The reload signal generating circuit 80 of the second embodiment comprises the edge detecting circuit 85 and AND gate 81, wherein the edge detecting circuit 85 detects the rising edge of an input signal from the outside to the external input terminal 32, and outputs a signal of "H" level, similarly to the case of the first embodiment, then, when a reload enable signal RLEN is outputted by the CPU 31, the output signal of the AND gate 81 becomes of "H" level and a reload signal RL is generated.

The reload signal RL is supplied to the NAND gates 8 (8-1, 8-2, 8-3, 8-4, 8-5, 8-6). Therefore, when the reload signal RL is generated, the contents of registers 9-1, 9-2, 9-3, 9-4, 9-5 and 9-6 of the shift register 9S are reloaded to the operation mode registers 4-1, 4-2, 4-3, 4-4, 4-5 and 4-6 of the operation mode register group 4G.

FIGS. 7(*a*) to 7(*f*) show waveform charts of actual output examples corresponding to three-phase output waveforms by using an output control circuit of the invention.

Next, operation of the second embodiment of the output control circuit as above according to the invention is described.

The different point of the operation of the second embodiment configured in such a manner from that of the first embodiment is that plural data can be shared between the operation mode registers 4-1, 4-2, 4-3, 4-4, 4-5 and 4-6 of the operation mode register group 4G by storing the plural data in the registers 9-1, 9-2, 9-3, 9-4, 9-5 and 9-6 of the shift register 9S, and shifting the contents of the registers 9-1, 9-2, 9-3, 9-4, 9-5 and 9-6 in succession by the shift clock SCLK. Therefore, in case of generating such three-phase output waveforms as shown in FIGS. 7(*a*) to 7(*f*) by the output control circuit, phases U, V, W, #U, #V and #W of the PWM waveform should be outputted with 60 degrees shifted respectively. The second embodiment is configured to fulfill such requirement.

In the description below, it is assumed that the output control unit 301 comprises the register 9-1 and the operation mode register 4-1, and outputs phase U. Similarly, the output control unit 302 comprises the register 9-2 and the operation mode register 4-2, and outputs phase #V. The output control unit 303 comprises the register 9-3 and the operation mode register 4-3, and outputs phase W. The output control unit 304 comprises the register 9-4 and the operation mode register 4-4, and outputs phase #U. The output control unit 305 comprises the register 9-5 and the operation mode register 4-5, and outputs phase V. The output control unit 306 comprises the register 9-6 and the operation mode register 4-6, and outputs phase #W.

In FIGS. 7(a) to 7(f), it is assumed, for example, that data "1", "1", "0", "0", "0", "0" are set in the registers 9-1, 9-2, 9-3, 9-4, 9-5 and 9-6 of the shift register 9S, respectively, by the CPU 31 through the data bus 6. In addition, data "1" is set beforehand in the port latch 2 of the output control circuits 301 to 306 by the CPU 31 through the data bus 6. Further, the flip-flops 3 of the output control circuits 301 to 306 are assumed to output signals "1" and "0" repetitively, by the fact that they are set and reset in synchronization with a PWM output cycle.

Then, when it is assumed that a reload enable signal RLEN is outputted from the CPU 31 and an input signal to the external input terminal 32 rises from "L" level to "H" level at time T0, data "1", "1", "0", "0", "0", "0" are succeedingly reloaded to the operation mode registers 4-1, 4-2, 4-3, 4-4, 4-5 and 4-6 of the operation mode register group 4G, respectively.

In such case, the output control circuit 301 comprising the register 9-1 and operating mode register 4-1, and the output control circuit 302 comprising the register 9-2 and operating mode register 4-2 provide outputs of the respective flip-flops 3 from the input/output terminals 5, and the other output control circuits 303, 304, 305 and 306 provide outputs of the respective port latches 2 from the input/output terminals 5. Therefore, as shown between times T0 and T1 in FIG. 7, the output control circuits 301 and 302 provide a PWM waveform of phases U and #V, respectively, from the input/output terminals 5, and signals "1" are outputted from the input/output terminals 5 of the other output control circuits 303, 304, 305 and 306 that provide outputs of phases W, #U, V and #W.

Thereafter, until time T1, the contents of registers 9-1, 9-2, 9-3, 9-4, 9-5 and 9-6 of the shift register 9S are shifted by the shift clock SCLK. Accordingly, "1", "0", "0", "0", "0" and "1" are held by the registers 9-1, 9-2, 9-3, 9-4, 9-5 and 9-6, respectively. Then, at time T1, when the input signal to the external input terminal 32 rises From "L" level to "H" level again, "1", "0", "0", "0", "0" and "1" are reloaded to the operation mode registers 4-1, 4-2, 4-3, 4-4 4-5 and 4-6 of the operation mode register group 4G, respectively.

Therefore, after time T1, the output control circuit 301 comprising the register 9-1 and operation mode register 4-1, and the output control circuit 306 comprising the register 9-6 and operation mode register 4-6 provide outputs of the respective flip-flops 3 from the input/output terminals 5, and the other output control circuits 302, 303, 304 and 305 provide outputs of the respective port latches 2 from the input/output terminals 5. Thus, as shown in FIG. 7, the output control circuits 301 and 306 output, a PWM waveform of phases U and #W, respectively, from the input/output terminals 5, and a signal "1" is outputted from the input/output terminals 5 of the other output control circuits 302, 303, 304 and 305 which provide outputs of phases #V, W, #U and V.

After then, until time T, the contents of registers 9-1, 9-2, 9-3, 9-4, 9-5 and 9-6 of the shift register 9S are shifted by the shift clock SCLK. Accordingly, "0", "0", "0", "0", "1" and "1" are held, respectively, in the registers 9-1, 9-2, 9-3, 9-4, 9-5 and 9-6. Then, at time T2, when the input signal to the external input terminal 32 rises from "L" level to "H" level again, "0", "0", "0", "0", "1" and "1" are reloaded to the operation mode registers 4-1, 4-2, 4-3, 4-4, 4-5 and 4-6 of the operation mode register group 4G, respectively.

Therefore, after time 2, the output control circuit 305 comprising the register 9-5 and operating mode register 4-5, and the output control circuit 306 comprising the register 9-6 and operation mode register 4-6 provides outputs of the respective flip-flops 3 from the input/output terminals 5, and the other output control circuits 301, 302, 303 and 304 provides outputs of the respective port latches 2 from the input/output terminals 5. Thus, as shown in FIG. 7, PWM waveforms of phases V and #W are outputted, respectively, From the input/output terminals 5 of the output control circuits 305 and 306, and signals "1" are outputted from the input/output terminals 5 of the other output control circuits 301, 302, 303 and 305 which provides outputs of phases U, #V, W and #U.

In a such manner, from time T3 to T4, the output control circuits 304 and 305 output PWM waveforms, respectively, from the input/output terminals 5, while the other output control circuits 301, 302, 303 and 306 output signals "1", respectively, from the input/output terminal 5. From time T4 to T5, the output control circuits 303 and 304 output PWM waveforms, respectively, from the input/output terminals 5, while the other output control circuits 301, 302, 305 and 306 output signals "1", respectively, from the input/output terminals 5. Then, from time T5 to T6, the output control circuits 302 and 303 output PWM waveforms, respectively, from the input/output terminals 5, while the other output control circuits 301, 304, 305 and 306 output signals "1", respectively, from the input/output terminals 5.

After time T6, the aforementioned operation after time T0 is repetitively executed.

Thus, in the second embodiment, a time lag in switching between functions of the input/output terminal 5 is reduced, operational requirements of software is lightened, and the control accuracy is increased, by the fact that the CPU 31 is simply required to set "1" in the direction registers 1 of the output control circuits 301 to 306 and "1" in the port latches 2, respectively, and to perform setting of each register 9-1 to 9-6 of the shift register 9S, in order to provide outputs of PWM waveforms of three phases.

As described in detail above, according to the output control circuit of the invention, since information specifying a signal source to be connected next with the input/output terminal is directly reloaded from the second storing means (operation mode reload register or register) to the First storing means (operation mode register) by a reload signal, and connection between the output terminal and signal sources can be switched, a time lag is reduced, and the control accuracy is increased, comparing with switching operation only by means of software.

In addition, according to the output control circuit of the invention, since the information specifying the aforementioned signal source is reloaded from the second storing means to the first storing means by inputting a signal from the outside to the external input terminal, it is preferably applied as a controller of an external actuator.

Furthermore, according to the output control circuit of the invention, since data set in the shift register configured by the second storing means is periodically reloaded to the first storing means, it is preferable for such application that information to be set in the first storing means is successively and periodically changed.

Moreover, according to the output control circuit of the invention, since generation of three phases of PWM waveforms and their inverted phases is facilitated, it is preferably used for controlling a three-phase motor.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalents of such meets and bounds thereof are therefore intended to be embraced by the claims.

What is claimed is:

1. An output control circuit comprising:

an output terminal connected with at least two kinds of different signal sources;

first storing means for storing information specifying one of the signal sources from which a signal is outputted by said output terminal derives;

a circuit for making a signal output from said output terminal according to the information stored in said first storing means;

second storing means for storing the information to be stored in said first storing means;

reload signal generating means for generating a reload signal; and reloading means for reloading the information stored in said second storing means to said first storing means, when the reload signal is generated by said reload signal generating means.

2. An output control circuit as set forth in claim 1, further comprising:

an external input terminal, wherein said reload signal generating means generate the reload signal in response to a signal inputted from the external input terminal.

3. An output control circuit comprising:

an output terminal connected with at least two kinds of different signal sources;

first storing means for storing information specifying one of the signal sources from which a signal is outputted by the output terminal;

a circuit for making a signal output from said output terminal according to the information stored in the first storing means;

second storing means for storing the information to be stored in said first storing means;

reloading means for reloading the information stored in said second storing means to said first storing means;

n number of output; control units connected such that the respective second storing means function as shift register as a whole; and reload signal generating means for generating a reload signal.

4. An output, control circuit as set forth in claim 3, further comprising:

an external input terminal, wherein said reload signal generating means generate the reload signal in response to a signal inputted from the external input terminal.

5. An output control circuit comprising:

an output terminal connected with a first signal source which generates a signal of constant value and a second signal source which outputs a PWM waveform;

first storing means for storing information specifying one of the signal sources from which a signal is outputted by said output terminal;

a circuit for making a signal output from said output terminal according to the information stored in said first storing means;

second storing means for storing the information to be stored in said first storing means;

reloading means for reloading the information stored in said second storing means to said first storing means;

six output control units connected such that the respective second storing means function as shift registers as a whole, and respectively outputting signals of phases U, V and W of PWM waveforms and their inverted phases; and reload signal generating means for generating a reload signal, wherein said shift register is formed of a circulating-type combination of said second storing means included, respectively, in the output control units which output phases U, inverted V, W, inverted U, V, and inverted W in such order, and two sets of information specifying said second signal source and four sets of information specifying said first signal source are initially set in said six second storing means which forms said shift register.

6. An output control circuit as set forth in claim 5, further comprising:

an external input terminal, wherein said reload signal generating means generate the reload signal in response to a signal inputted from the external input terminal.

7. A circuit for programming an output terminal, comprising:

a first signal source selectively coupled to the output terminal for providing a constant value data signal as an output signal from the output terminal;

a second signal source selectively coupled to the output terminal for providing a pulse width modulation waveform as the output signal from the output terminal;

first storing means for storing information specifying either the first signal source or the second signal source to be coupled to provide the output signal from the output terminal;

second storing means for storing the information to be stored in the first storing means;

reload signal generating means for generating a reload signal; and reloading means for reloading the information stored in the second storing means to the first storing means when the reload signal is generated by the reload signal generating means.

8. The circuit according to claim 7, further comprising:

an external input terminal for receiving an external input signal, wherein the reload signal generating means generates the reload signal in response to the external input signal inputted to the external input terminal.

* * * * *